United States Patent
Tseng et al.

(10) Patent No.: US 7,210,208 B2
(45) Date of Patent: May 1, 2007

(54) SCREW MOUNTING JIG

(75) Inventors: Yi-Hsiang Tseng, Taipei (TW);
Chien-Ta Kang, Taoyuan (TW);
Ching-Chung Chen, Taipei (TW)

(73) Assignee: BENQ Corporation, Taoyuan (TW)

( * ) Notice: Subject to any disclaimer, the term of this patent is extended or adjusted under 35 U.S.C. 154(b) by 310 days.

(21) Appl. No.: 10/840,122

(22) Filed: May 6, 2004

(65) Prior Publication Data

US 2004/0226167 A1    Nov. 18, 2004

(30) Foreign Application Priority Data

May 14, 2003   (TW) ............................... 92208761 U

(51) Int. Cl.
*B25B 1/20* (2006.01)
(52) U.S. Cl. ................................... 29/281.5
(58) Field of Classification Search .............. 29/281.1, 29/281.5; 269/71, 239, 287, 90.5, 87.3, 45; 118/500
See application file for complete search history.

(56) References Cited

U.S. PATENT DOCUMENTS 2,433,172 A * 12/1947 Tipton ........................ 269/200
5,458,312 A * 10/1995 Goldberg ................. 248/444.1

* cited by examiner

*Primary Examiner*—Robert C. Watson
(74) *Attorney, Agent, or Firm*—Quintero Law Office

(57) ABSTRACT

A screw mounting jig. The jig supports an electronic device thereon. The electronic device includes a first surface and a second surface opposite to the first surface. A first screw hole is formed on the first surface, and a second screw hole is formed on the second surface. The jig includes a base and a supporting assembly. The electronic device is received in the supporting assembly. The supporting assembly is disposed on the base in a manner such that it rotates between a first position and a second position. When the supporting assembly is located at the first position, the first surface faces the base so that the second screw hole is exposed for insertion. When the supporting assembly is located at the second position, the second surface faces the base so that the first screw hole is exposed for insertion.

20 Claims, 8 Drawing Sheets

300

300

SCREW MOUNTING JIG

BACKGROUND OF THE INVENTION

1. Field of the Invention

The invention relates to a screw mounting jig; in particular, the invention relates to a rotatable jig that can mount screws at opposite sides of an electronic device.

2. Description of the Related Art

During processes for manufacturing electronic devices such as mobile phones, a screw mounting jig is a necessary tool. The structure and operation of the conventional screw mounting jig is described in the following based on a mobile phone.

Referring to FIG. 1a, a conventional screw mounting jig 1 can receive a mobile phone 2 to be assembled therein. The screw mounting jig 1 includes a base 10, a fixed plate 20, a rotary plate 30, and two shafts 40. The fixed plate 20, the rotary plate 30, and the shafts 40 are disposed on the base 10. The fixed plate 20 is formed with a receiving portion 21 for receiving the mobile phone 2 therein. The rotary plate 30 includes a plurality of guiding portions 31. The shafts 40 can rotate relative to the base 10. The positions of the guiding portions 31 correspond to screw holes 2a on the mobile phone 2 respectively.

To mount screws to the mobile phone 2, the mobile phone 2 is disposed in the receiving portion 21 of the fixed plate 20 of the screw mounting jig 1 as shown in FIG. 1a. Then, the rotary plate 30 is rotated to cover the mobile phone 2. At the same time, the guiding portions 31 of the rotary plate 20 are aligned with the screw holes 2a of the mobile phone 2 as shown in FIG. 1b. Sequentially, the screws are mounted to the mobile phone 2. Then, the rotary plate 30 is rotated again so as to expose the mobile phone 2. Thus, the mobile phone 2 after being assembled can be removed from the fixed plate 20.

However, since the appearance of the newly designed mobile phone is largely different from the conventional, the conventional screw mounting jig cannot be applied in the newly designed mobile phone. Specifically, according to the new design, the mobile phone needs to be assembled at its opposite sides. The conventional mounting screw mounting jig can only be applied in the mobile phone with only one side to be assembled. If the conventional screw mounting jig is applied in the newly designed mobile phone, it is very inconvenient for the operator. Moreover, the mobile phone may be damaged due to incorrect positioning.

SUMMARY OF THE INVENTION

In view of this, the invention provides a rotatable screw mounting jig that can precisely mount screws at opposite sides of an electronic device.

Accordingly, the invention provides a screw mounting jig for supporting an electronic device. The electronic device includes a first surface, a second surface opposite to the first surface, a first screw hole formed on the first surface, and a second screw hole formed on the second surface. The jig includes a base and a supporting assembly. The supporting assembly receives the electronic device therein, and is disposed on the base in a manner such that the supporting assembly rotates between a first position and a second position. When the supporting assembly is located at the first position, the first surface faces the base so that the second screw hole is exposed for insertion. When the supporting assembly is located at the second position, the second surface faces the base so that the first screw hole is exposed for insertion.

In a preferred embodiment, the supporting assembly includes a first plate and a second plate. The first plate is abutted by the first surface of the electronic device, and rotates relative to the base. The first plate includes a first guiding portion, corresponding to the first screw hole of the electronic device, and a first receiving portion for receiving the electronic device. The second plate is abutted by the second surface of the electronic device, and rotates relative to the base. The second plate includes a second guiding portion, corresponding to the second screw hole of the electronic device, and a second receiving portion for receiving the electronic device.

Furthermore, the supporting assembly includes a fixed device for combining the first plate and the second plate. The fixed device includes a first member and a second member. The first member is disposed on the first plate. The second member is disposed on the second plate, and corresponds to the first member. The first plate is combined with the second plate by the second member combining with the first member.

It is understood that both the first member and the second member are magnets. Alternatively, the first member is a magnet, and the second member is a screw. In addition, the first member is a screw, and the second member is a magnet.

In another preferred embodiment, the supporting assembly further includes a plurality of positioning devices for combining the first plate and the second plate. Each of the positioning devices includes a first magnetic member and a second magnetic member. The first magnetic member is disposed on the first plate. The second magnetic member is disposed on the second plate, and corresponds to the first magnetic member. The first magnetic member and the second magnetic member assist in the combination of the first plate and the second plate.

In another preferred embodiment, the jig further includes a first rod, a second rod, a first shaft, and a second shaft. The first rod is disposed on the base, and combines with the first plate. When the first plate is rotated, the first rod is used as a fulcrum. The second rod is disposed on the base, and combines with the second plate. When the second plate is rotated, the second rod is used as a fulcrum. The first shaft is disposed between the first rod and the supporting assembly. The second shaft is disposed between the second rod and the supporting assembly. The first shaft and the second shaft guide the supporting assembly to rotate along a predetermined path. Each first shaft and second shaft includes a protrusion respectively, and the supporting assembly includes a plurality of grooves corresponding to the protrusion. When the first plate and the second plate rotate, the protrusion is located in the groove.

BRIEF DESCRIPTION OF THE DRAWINGS

The present invention can be more fully understood by reading the subsequent detailed description and examples with references made to the accompanying drawings, wherein:

FIG. 2b is a top view of the screw mounting jig in FIG. 2a;

FIG. 2c is a side view of the screw mounting jig in FIG. 2a;

FIG. 3b is a rear view of an electronic device in FIG. 3a;

DETAILED DESCRIPTION OF THE INVENTION

First Embodiment

Figure 1A:
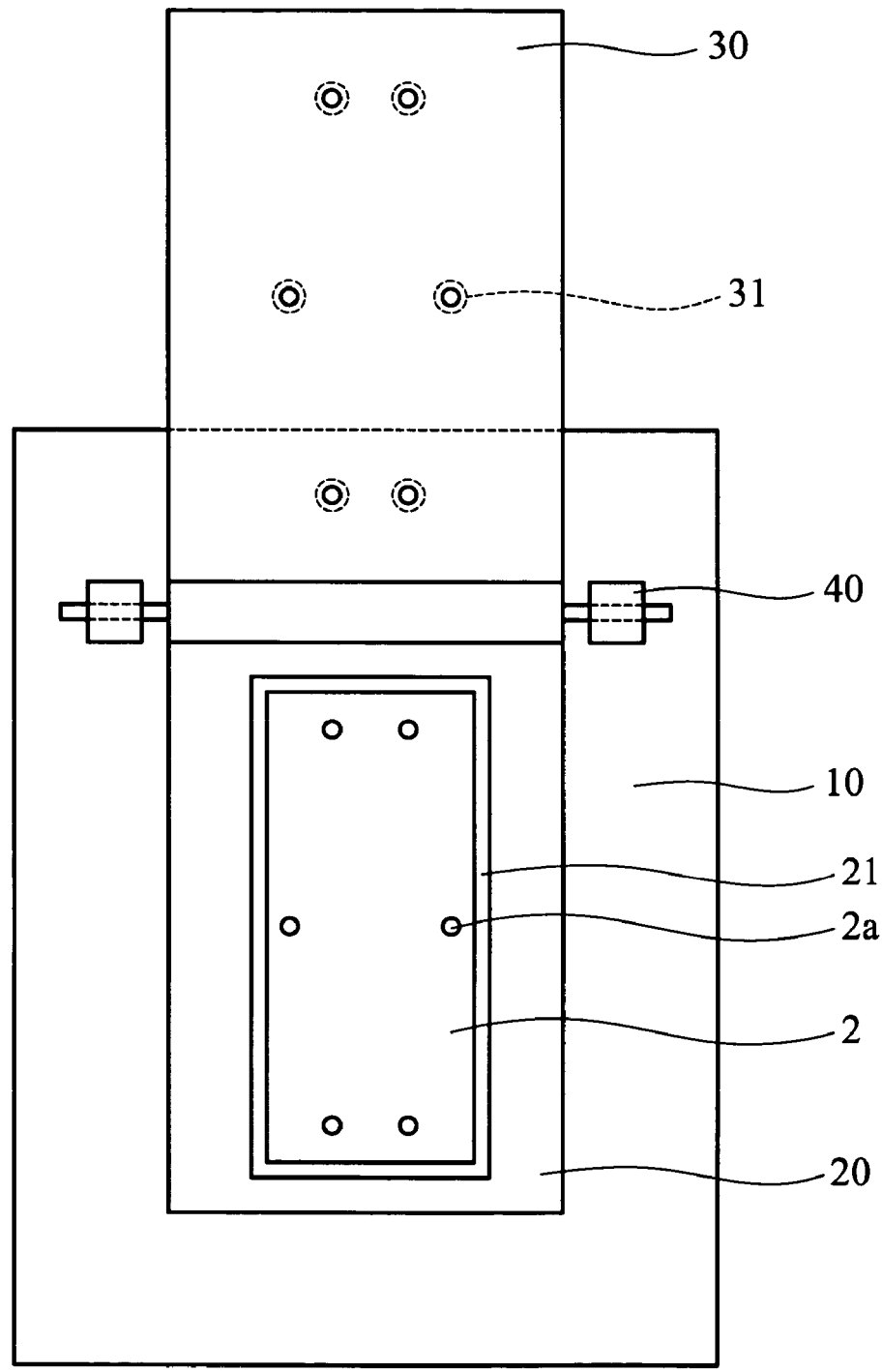
FIGS. 1a–1b are schematic views of a conventional screw mounting jig.
Figure 1B:
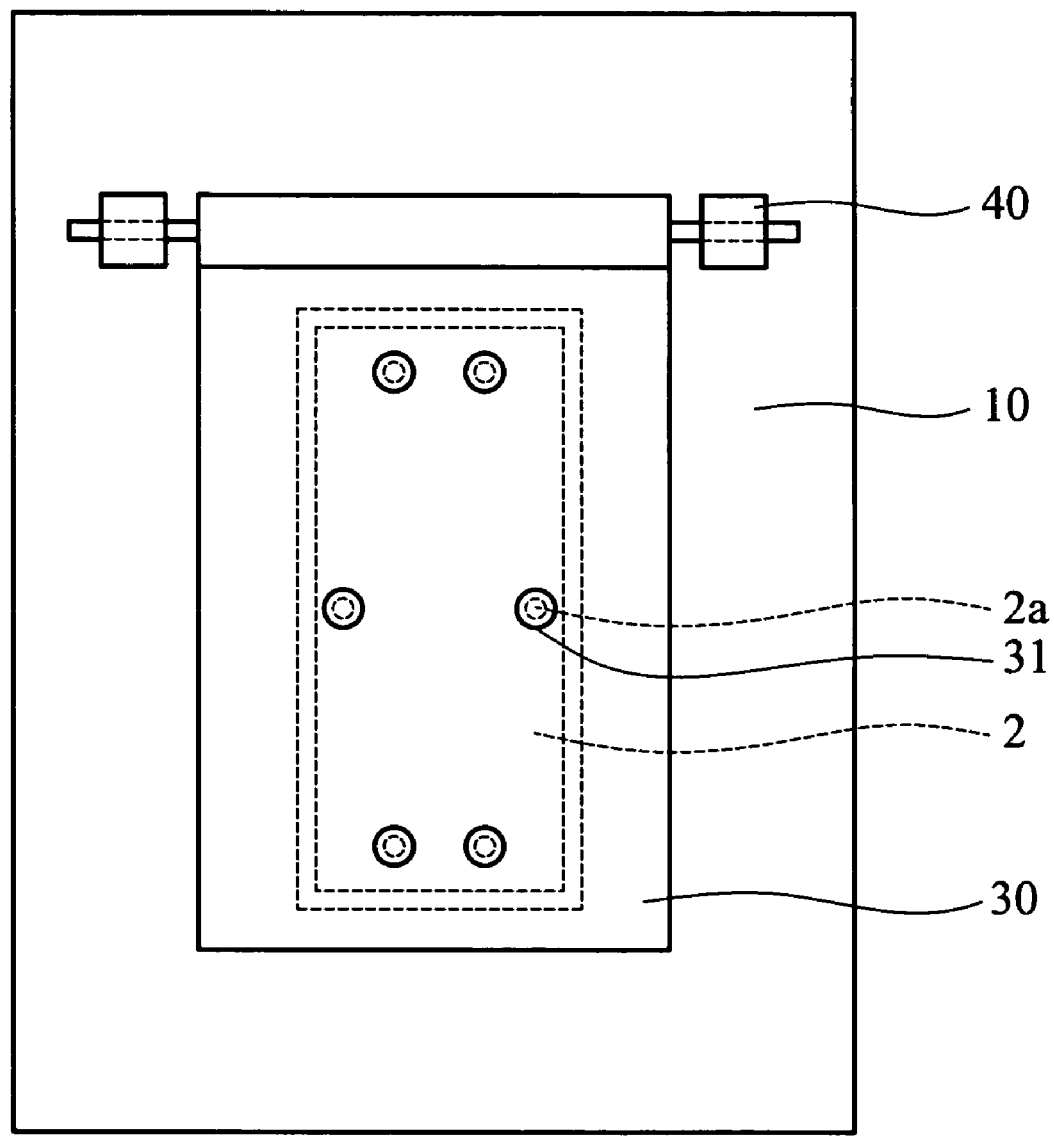
Figure 2A:
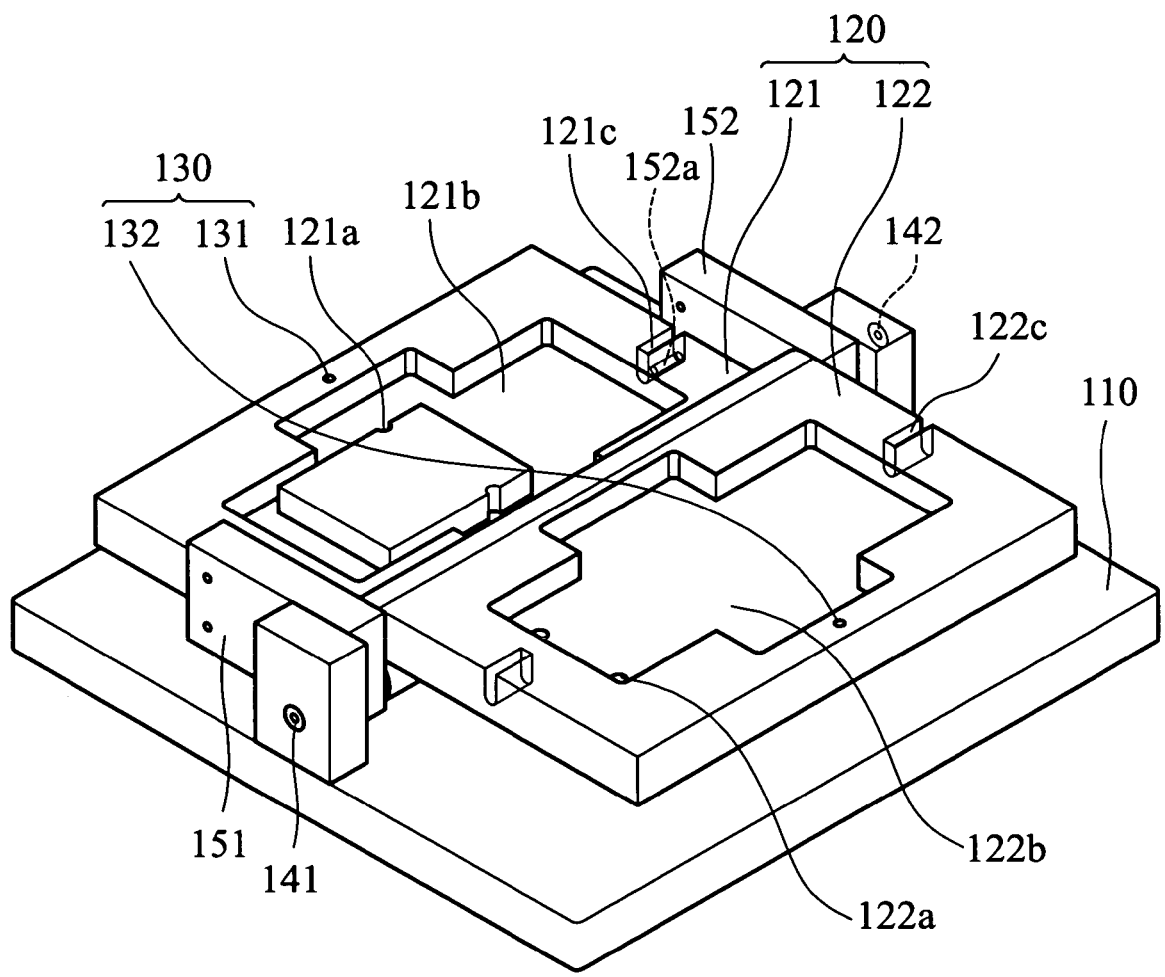
FIG. 2a is an exploded view of a screw mounting jig as disclosed in a first embodiment of the invention.
Figure 2B:
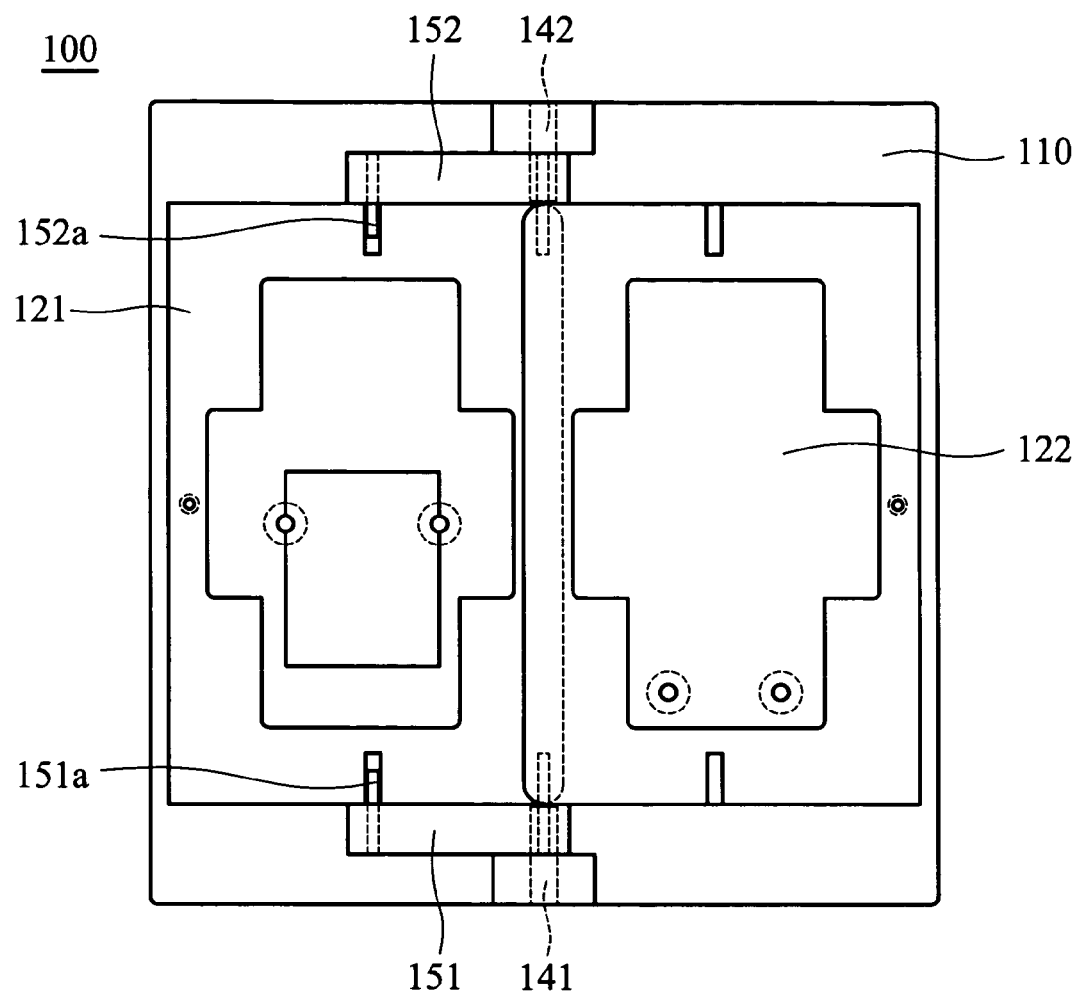
Figure 2C:
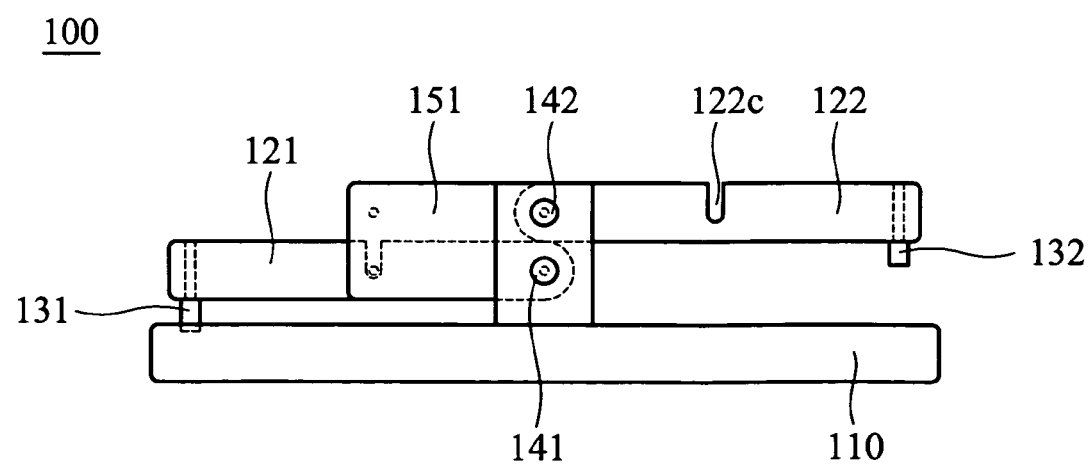
Figure 3A:
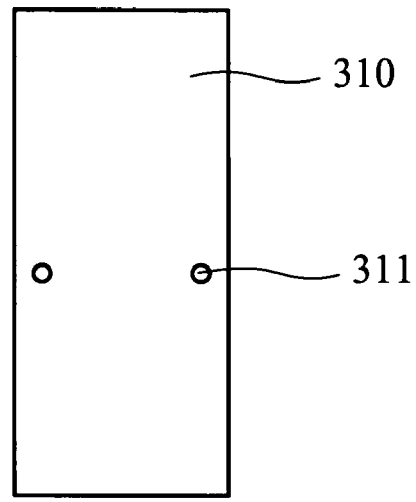
FIG. 3a is a front view of an electronic device.
Figure 3B:
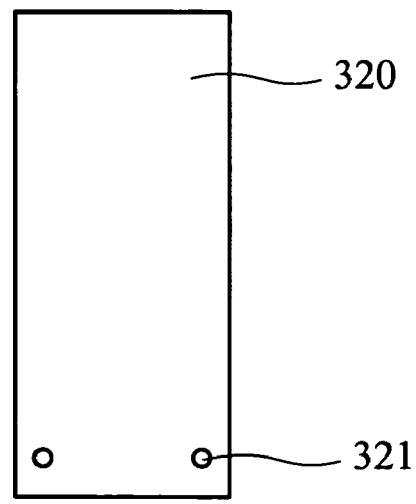

Referring to FIGS. 2a–2c, a screw mounting jig 100 as disclosed in a first embodiment of the invention is provided. The screw mounting jig 100 can support an electronic device 300 as shown in FIGS. 3a–3b therein, and perform the screw attachment of the electronic device 300. Referring to FIGS. 3a–3b, the electronic device 300 includes a first surface 310, a second surface 320 opposite to the first surface 310, two first screw holes 311 formed on the first surface 310, two second screw holes 321 formed on the second surface 320.

In this embodiment, the screw mounting jig 100 includes a base 110, a supporting assembly 120, and a fixed device 130. The base 110 is used as a bottom component of the screw mounting jig 100, and other components of the screw mounting jig 100 are disposed on the base 110.

Figure 4A:
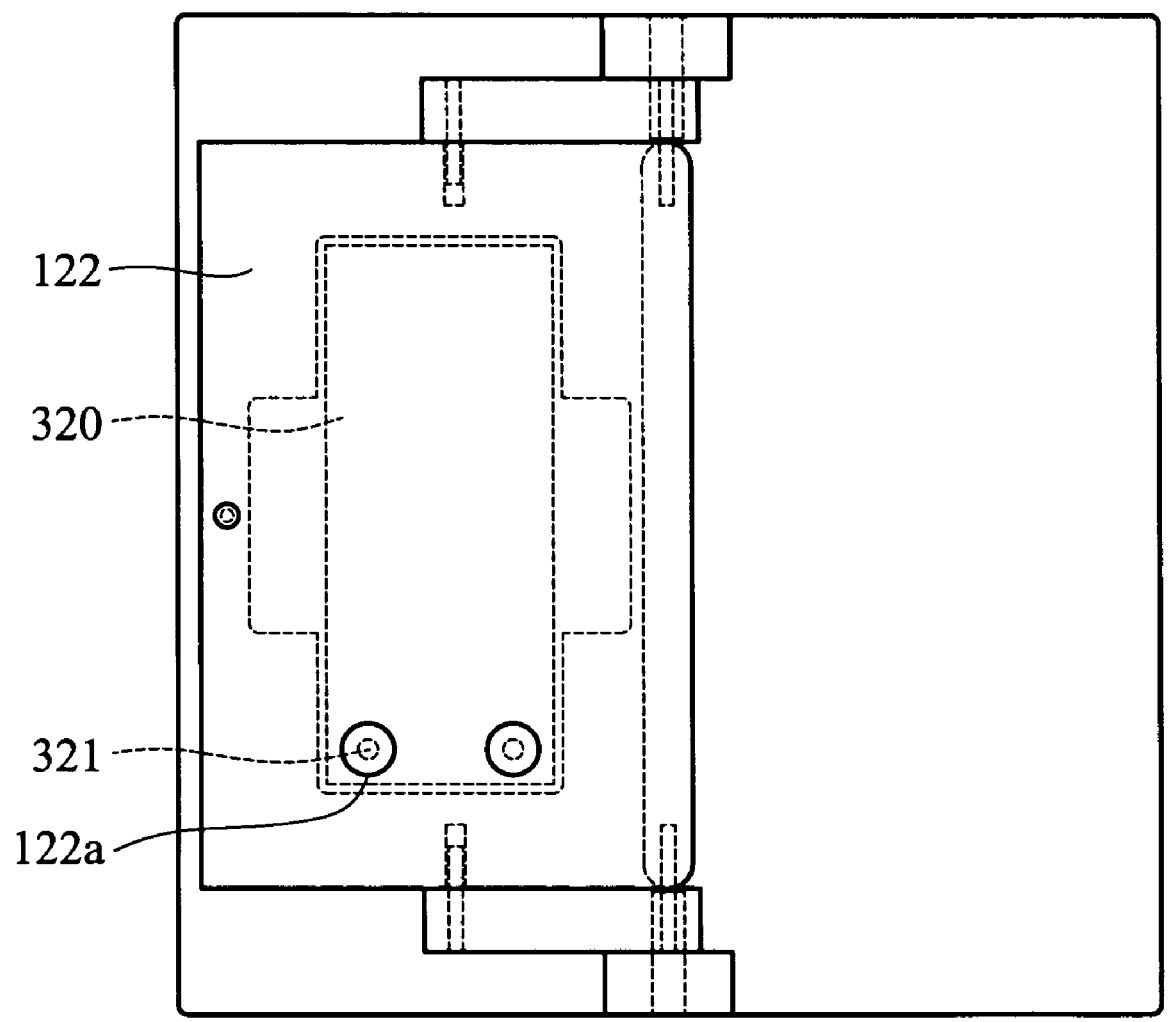
FIG. 4a is a top view of the screw mounting jig in FIG. 2a, wherein a supporting assembly is located at a first position.
Figure 4B:
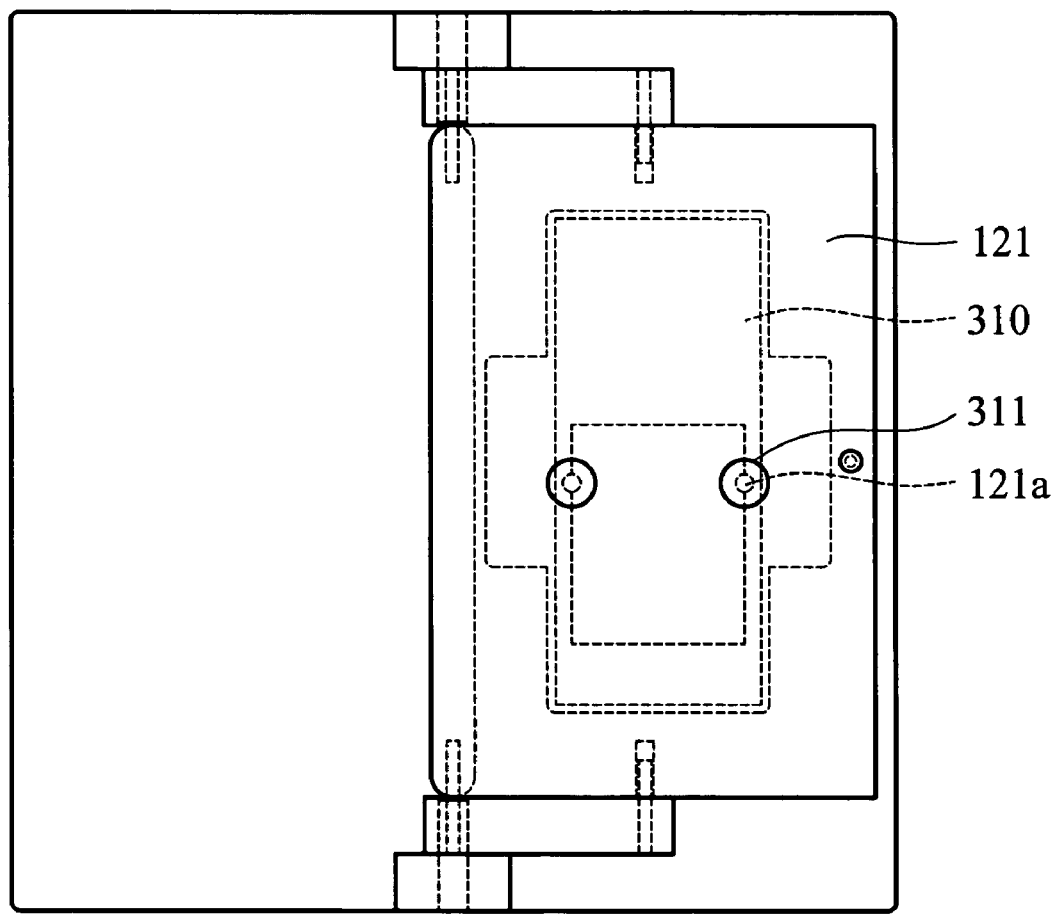
FIG. 4b is a top view of the screw mounting jig in FIG. 2a, wherein the supporting assembly is located at a second position.

The supporting assembly 120 receives the electronic device 300 therein, and is disposed on the base 110 in a manner such that the supporting assembly 120 rotates between a first position as shown in FIG. 4a and a second position as shown in FIG. 4b. The supporting assembly 120 includes a first plate 121 and a second plate 122. When the electronic device 300 is disposed in the supporting assembly 120, the first plate 121 is abutted by the first surface 310 of the electronic device 300, and the second plate 122 is abutted by the second surface 320 of the electronic device 300. Thus, when the supporting assembly 120 is located at the first position as shown in FIG. 4a, the first surface 310 of the electronic device 300 faces the base 110 so that the second screw holes 321 on the second surface 320 of the electronic device 300 are exposed for insertion. When the supporting assembly 120 is located at the second position as shown in FIG. 4b, the second surface 320 of the electronic device 300 faces the base 110 so that the first screw holes 311 on the first surface 310 of the electronic device 300 are exposed for insertion.

Referring to FIG. 2a, the first plate 121 can rotate relative to the base 110, and includes two first guiding portions 121a, a first receiving portion 121b, and two grooves 121c. Each of the first guiding portions 121a corresponds to the first screw hole 311 on the first surface 310 of the electronic device 300 respectively, and guides screws (not shown) from the outside into the first screw holes 311. The first receiving portion 121b receives the electronic device 300 therein. The grooves 121c are located at the top edge and the bottom edge of the first plate 121, and assist in the positioning of the supporting assembly 120 during rotation.

The second plate 122 can rotate relative to the base 110, and includes two second guiding portions 122a, a second receiving portion 122b, and two grooves 122c. Each of the second guiding portions 122a corresponds to the second screw hole 321 on the second surface 320 of the electronic device 300 respectively, and guides the screws (not shown) from the outside into the second screw holes 321. The second receiving portion 122b receives the electronic device 300 therein. The grooves 122c are located at the top edge and the bottom edge of the second plate 122, and assist in the positioning of the supporting assembly 120 during rotation.

It is understood that the number of first guiding portions 121a and second guiding portions 122a are not limited to two as shown in the figures. That is, the number of first guiding portions 121a and second guiding portions 122a can be adjusted based on the amount of the screw holes required by the electronic device.

The fixed device 130 combines the first plate 121 and the second plate 122 of the supporting assembly 120, and includes a first member 131 and a second member 132. The first member 130 is disposed on the first plate 121 of the supporting assembly 120. The second member 132 is disposed on the second plate 122 of the supporting assembly 120, and corresponds to the first member 131. The first plate 121 is combined with the second plate 122 by the second member 132 combining with the first member 131.

It is understood that both the first member 131 and the second member 132 may be magnets as long as the second member 132 can be combined with the first member 131. Alternatively, the first member 131 may be a magnet, and the second member 132 may be a metallic member such as a screw. In addition, the first member 131 may be a metallic member, and the second member 132 may be a magnet.

The screw mounting jig 100 further includes a first rod 141, a second rod 142, a first shaft 151, and a second shaft 152. The first rod 141 is disposed on the base 110, and combines with the first plate 121 as shown in FIG. 2c. When the first plate 121 is rotated, the first rod 141 is used as a fulcrum. The second rod 142 is disposed on the base 110, and combines with the second plate 122 as shown in FIG. 2c. When the second plate 122 is rotated, the second rod 142 is used as a fulcrum.

Referring to FIG. 2b, the first shaft 151 is disposed between the first rod 141 and the supporting assembly 120. The second shaft 152 is disposed between the second rod 142 and the supporting assembly 120. The first shaft 151 and the second shaft 152 guide the supporting assembly 120 to rotate along a predetermined path.

Each first shaft 151 and second shaft 152 includes a protrusion 151a, 152a corresponding to the grooves 121c, 122c of the supporting assembly 120 respectively. By positioning the protrusions 151a, 152a in the grooves 121c, 122c, the supporting assembly 120 can move along a predetermined path during rotation. Thus, the relationship between the first plate 121 and the second plate 122 can be maintained during rotation.

The structure of the screw mounting jig 100 is described as stated above, and their operation theorem is described in the following.

To mount screws on the electronic device 300, the supporting assembly 120 of the screw mounting jig 100 is positioned shown in FIG. 2b. After the electronic device 300 is disposed in the first receiving portion 121b of the first plate 121, the second plate 122 is rotated to cover the electronic device 300. At this time, the supporting assembly 120 is located in the first position, the first surface 310 of the electronic device 300 faces the base 110 so that the second guiding portions 122a are aligned with the second screw holes 321 on the second surface 320 of the electronic device 300 respectively. Thus, the second screw holes 321 on the second surface 320 of the electronic device 300 are exposed so as to be inserted as shown in FIG. 4a. After the screws are inserted into the second screw holes 321, the supporting assembly 120 is rotated to the second position by the first shaft 151 and the second shaft 152. At this time, the second surface 320 of the electronic device 300 faces the base 110 so that the first guiding portions 121a are aligned with the first screw holes 311 on the first surface 310 of the electronic device 300. Thus, the first screw holes 311 on the first surface 310 of the electronic device 300 are exposed so as to be inserted as shown in FIG. 4b. After the screws are inserted into the first screw holes 311, the first plate 121 is rotated so as to expose the electronic device 300. Then, the electronic device 300 can be taken out of the supporting assembly 120.

The screw mounting jig of this embodiment can attain the following advantages. By the shafts and rods, the electronic device in the supporting assembly can be freely rotated in a predetermined axis. Thus, the removal of the electronic device can be omitted, and damage caused by removal can be avoided. In addition, since both sides of the electronic device can be assembled in the same jig, the process for mounting screws can be simplified, thus enhancing efficiency.

Second Embodiment

Figure 5:
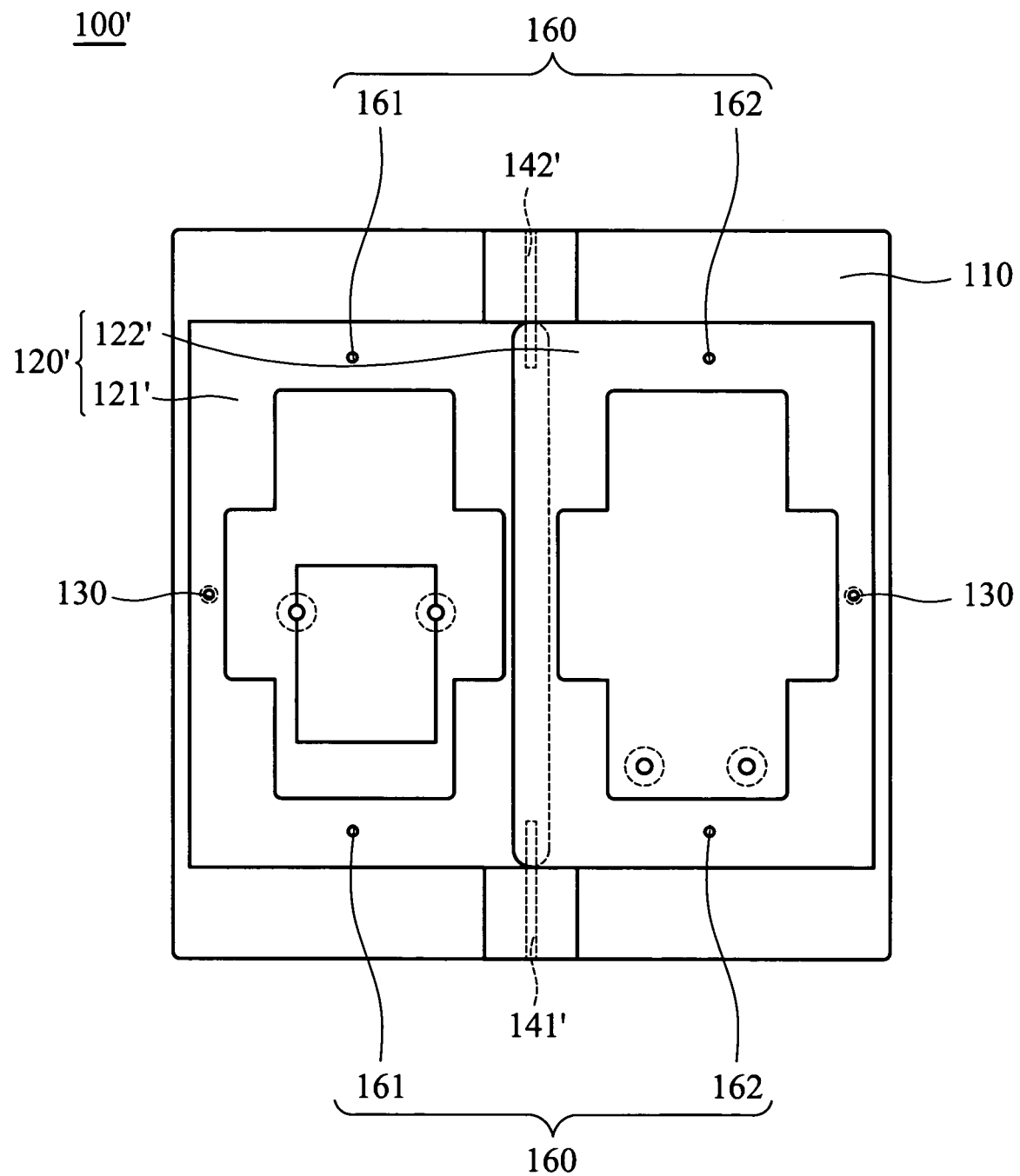
FIG. 5 is a top view of a screw mounting jig as disclosed in a second embodiment of the invention.

FIG. 5 is a top view of a screw mounting jig 100' as disclosed in a second embodiment of the invention. The screw mounting jig 100' includes a base 110, a supporting assembly 120', a fixed device 130', a first rod 141', a second rod 142', and a plurality of positioning devices 160. It is noted that the components in this embodiment same as those in the first embodiment are presented by the same references, and their description is omitted.

The second embodiment differs from the first embodiment in that the first shaft and the second shaft of the first embodiment are omitted. That is, the first rod 141' is directly connected to the first plate 121', and the second rod 142' is directly connected to the second plate 122'.

Furthermore, in this embodiment, the positioning devices 160 are added so as to combine the first plate 121' and the second plate 122'. Thus, when the supporting assembly 120' is rotated, the relationship between the first plate 121' and the second plate 122' can be maintained. Each of the positioning devices 160 includes a first magnetic member 161 and a second magnetic member 162. The first magnetic member 161 is disposed on the first plate 121'. The second magnetic member 162 is disposed on the second plate 122', and corresponds to the first magnetic member 162. The first magnetic member 161 and the second magnetic member 162 assist in the combination of the first plate 121' and the second plate 122'.

The operation theorem of the screw mounting jig of this embodiment is the same as that of the first embodiment, and their detailed description is omitted. Also, since both sides of the electronic device can be assembled in the same jig, the advantages of the first embodiment can be attained in this embodiment.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A screw mounting jig for supporting an electronic device, wherein the electronic device includes a first surface, a second surface opposite to the first surface, a first screw hole formed on the first surface, and a second screw hole formed on the second surface, and the jig comprises:
   a base; and
   a supporting assembly, for receiving the electronic device, disposed on the base in a manner such that the supporting assembly rotates between a first position and a second position, wherein the supporting assembly comprises a first plate, a second plate and a plurality of positioning devices, the first plate is abutted by the first surface of the electronic device and rotates relative to the base, the second plate is abutted by the second surface of the electronic device and rotates relative to the base, the plurality of positioning devices combine the first plate and the second plate, the first surface of the electronic device faces the base so that the second screw hole on the second surface is exposed for insertion when the supporting assembly is located at the first position, and the second surface of the electronic device faces the base so that the first screw hole on the first surface is exposed for insertion when the supporting assembly is located at the second position.

2. The jig as claimed in claim 1, wherein the first plate includes a first guiding portion corresponding to the first screw hole of the electronic device.

3. The jig as claimed in claim 1, wherein the second plate includes a second guiding portion corresponding to the second screw hole of the electronic device.

4. The jig as claimed in claim 1, wherein the first plate includes a first receiving portion for receiving the electronic device.

5. The jig as claimed in claim 1, wherein the second plate includes a second receiving portion for receiving the electronic device.

6. The jig as claimed in claim 1, wherein the supporting assembly further comprises:
   a fixed device for combining the first plate and the second plate.

7. The jig as claimed in claim 6, wherein the fixed device comprises:
   a first member disposed on the first plate; and
   a second member, disposed on the second plate, corresponding to the first member, wherein the first plate is combined with the second plate by the second member combining with the first member.

8. The jig as claimed in claim 7, wherein both the first member and the second member are magnets.

9. The jig as claimed in claim 7, wherein the first member is a magnet, and the second member is a screw.

10. The jig as claimed in claim 7, wherein the first member is a screw, and the second member is a magnet.

11. The jig as claimed in claim 1, wherein each of the positioning devices comprises:
   a first magnetic member disposed on the first plate; and
   a second magnetic member, disposed on the second plate, corresponding to the first magnetic member, wherein the first magnetic member and the second magnetic member assist in the combination of the first plate and the second plate.

12. The jig as claimed in claim 1, further comprising:
   a first rod, disposed on the base, combining with the first plate, wherein the first rod is used as a fulcrum when the first plate is rotated; and a second rod, disposed on the base, combining with the second plate, wherein the second rod is used as a fulcrum when the second plate is rotated.

13. The jig as claimed in claim 12, further comprising:
a first shaft disposed between the first rod and the supporting assembly; and
a second shaft disposed between the second rod and the supporting assembly, wherein the first shaft and the second shaft guide the supporting assembly to rotate along a predetermined path.

14. The jig as claimed in claim 13, wherein each the first shaft and the second shaft includes a protrusion respectively, the supporting assembly includes a plurality of grooves corresponding to the protrusion, and the protrusion is located in the groove when the first plate and the second plate rotate.

15. A screw mounting jig comprising:
a base; and
a supporting assembly, disposed on the base, comprising a first plate, a second plate and a fixed device, wherein the first plate rotates relative to the base, the second plate rotates relative to the base, the fixed device combines the first plate and the second plate and comprises a first member and a second member, the first member is disposed on the first plate, the second member is disposed on the second plate and corresponds to the first member, both the first member and the second member are magnets, and the first plate is combined with the second plate by the second member combining with the first member.

16. The jig as claimed in claim 15, wherein the first plate includes a first guiding portion.

17. The jig as claimed in claim 15, wherein the second plate includes a second guiding portion.

18. The jig as claimed in claim 15, wherein the first plate includes a first receiving portion.

19. The jig as claimed in claim 15, wherein the second plate includes a second receiving portion.

20. The jig as claimed in claim 15, wherein the supporting assembly further comprises:
a plurality of positioning devices for combining the first plate and the second plate.

* * * * *